United States Patent
Wang et al.

(10) Patent No.: US 11,362,531 B2
(45) Date of Patent: Jun. 14, 2022

(54) AUDIO ADJUSTMENT METHOD AND ELECTRONIC DEVICE THEREOF

(71) Applicant: SZ DJI TECHNOLOGY CO., LTD., Shenzhen (CN)

(72) Inventors: Jianmin Wang, Shenzhen (CN); Xiaohu Yang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 440 days.

(21) Appl. No.: 16/503,988

(22) Filed: Jul. 5, 2019

(65) Prior Publication Data
US 2019/0334364 A1   Oct. 31, 2019

Related U.S. Application Data

(63) Continuation of application No. PCT/CN2017/070340, filed on Jan. 5, 2017.

(51) Int. Cl.
*H02J 7/00* (2006.01)
*H01M 6/50* (2006.01)
*H01M 10/44* (2006.01)
*H02J 7/34* (2006.01)

(52) U.S. Cl.
CPC ......... *H02J 7/0068* (2013.01); *H01M 6/5033* (2013.01); *H01M 10/446* (2013.01); *H02J 7/0036* (2013.01); *H02J 7/0047* (2013.01); *H02J 7/0063* (2013.01); *H02J 7/342* (2020.01); *H02J 2207/10* (2020.01)

(58) Field of Classification Search
CPC ........ H02J 7/0068; H02J 7/342; H02J 7/0036; H02J 7/0047; H02J 7/0063; H02J 2207/10; H01M 6/5033; H01M 10/446
See application file for complete search history.

(56) References Cited

U.S. PATENT DOCUMENTS 6,628,107 B1 * 9/2003 Bang .................. G06F 1/30
                                                          323/266

FOREIGN PATENT DOCUMENTS

| CN | 2762449 Y | 3/2006 |
|---|---|---|
| CN | 2817172 Y | 9/2006 |
| CN | 201758389 U | 3/2011 |
| CN | 201789318 U | 4/2011 |
| CN | 102355020 A | 2/2012 |
| CN | 102931720 A | 2/2013 |
| CN | 103581371 A | 2/2014 |
| CN | 204809896 U | 11/2015 |

(Continued)

OTHER PUBLICATIONS

The World Intellectual Property Organization (WIPO) International Search Report and Written Opinion for PCT/CN2017/070340 dated Oct. 12, 2017 6 Pages.

*Primary Examiner* — Carlos Amaya
(74) *Attorney, Agent, or Firm* — Anova Law Group, PLLC

(57) ABSTRACT

A control method is provided for controlling an electronic device having a main body. The control method may include: in response to the electronic device being activated and a primary battery being functionally connected to the main body of the electronic device, controlling the primary battery to power the electronic device; and in response to the electronic device being activated and the primary battery being functionally disconnected from the main body of the electronic device, controlling a backup battery to power the electronic device.

16 Claims, 18 Drawing Sheets control the primary battery to supply power to the electronic device when the electronic device is activated and the primary battery is functionally connected to the main body — S11 control the backup battery to supply power to the electronic device when the electronic device is activated and the primary battery fails to connect with the main body — S12

(56) References Cited

FOREIGN PATENT DOCUMENTS

| | | |
|---|---|---|
| CN | 105277889 A | 1/2016 |
| CN | 106208219 A | 12/2016 |
| JP | 2016054643 A | 4/2016 |

* cited by examiner

AUDIO ADJUSTMENT METHOD AND ELECTRONIC DEVICE THEREOF

CROSS-REFERENCE TO RELATED APPLICATION

This application is a continuation application of International Application No. PCT/CN2017/070340, filed on Jan. 5, 2017, the entire contents of which are incorporated herein by reference.

TECHNICAL FIELD

The present disclosure relates to the field of power supply technologies and, in particular, to a control method, a control device, and an electronic device having the same.

BACKGROUND

In order to meet the trend of slim and light-weight design of electronic devices, the design for batteries of electronic devices generally aims for being slim and light-weight, which may result in poor battery capacity and unsatisfactory performance. Particularly when an electronic device is used for outdoor aerial photography, it is difficult for the batteries to meet the requirement for continued operation. In order to solve the problem of insufficient battery capacity, a charging device may be carried to recharge the battery. However, the charging device is generally cumbersome and inconvenient to carry. Further, an operating electronic device may require occupying the charging interface, and thus a charging operation cannot be performed simultaneously during an operation of another electronic device.

SUMMARY

In one aspect of the present disclosure, a control method is provided. The control method is for controlling an electronic device having a main body. The control method may include: in response to the electronic device being activated and a primary battery being functionally connected to the main body of the electronic device, controlling the primary battery to power the electronic device; and in response to the electronic device being activated and the primary battery being functionally disconnected from the main body of the electronic device, controlling a backup battery to power the electronic device.

In another aspect of the present disclosure, a control device for controlling an electronic device is provided. The control device may include: a memory storing a computer program, and a processor coupled to the memory to execute the computer program to cause the processor to perform: in response to the electronic device being activated and a primary battery being functionally connected to the main body of the electronic device, controlling the primary battery to power the electronic device; and in response to the electronic device being activated and the primary battery being functionally disconnected from the main body of the electronic device, controlling a backup battery to power the electronic device.

In another aspect of the present disclosure, an electronic device is included. The electronic device may include: a main body; a primary battery; a backup battery; and a control device configured to perform: in response to the electronic device being activated and a primary battery being functionally connected to the main body of the electronic device, controlling the primary battery to power the electronic device; and in response to the electronic device being activated and the primary battery being functionally disconnected from the main body of the electronic device, controlling a backup battery to power the electronic device.

The above aspects will be explained in detail with accompanying drawings.

DETAILED DESCRIPTION OF THE EMBODIMENTS

Figure 1:
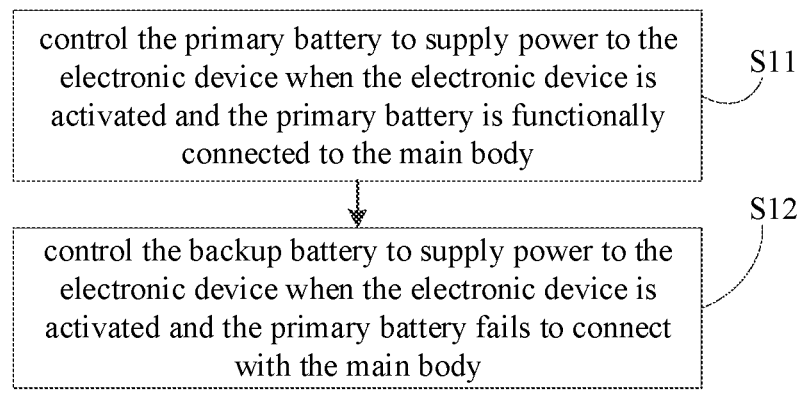
FIG. 1 illustrates a control method according to certain embodiments of the present disclosure.

The embodiments of the present disclosure are described in detail below with reference to the drawings. In the drawings, the same or similar reference numerals may indicate the same or similar elements or elements having the same or similar functions. The embodiments described below are intended to be illustrative of the invention and are not to be construed as limiting.

FIG. 1 illustrates a control method according to certain embodiments. The control method may be used to control an electronic device. The electronic device may include a main body, a backup battery, and a primary battery. The backup battery may be disposed on the main body. The primary battery may be detachably connected to the main body. The control method may include the following steps.

Step S11 is to control the primary battery to supply power to the electronic device when the electronic device is activated and the primary battery is successfully connected to the main body. Step S12 is to control the backup battery to supply power to the electronic device when the electronic device is activated and the primary battery fails to connect with the main body.

Figure 2:
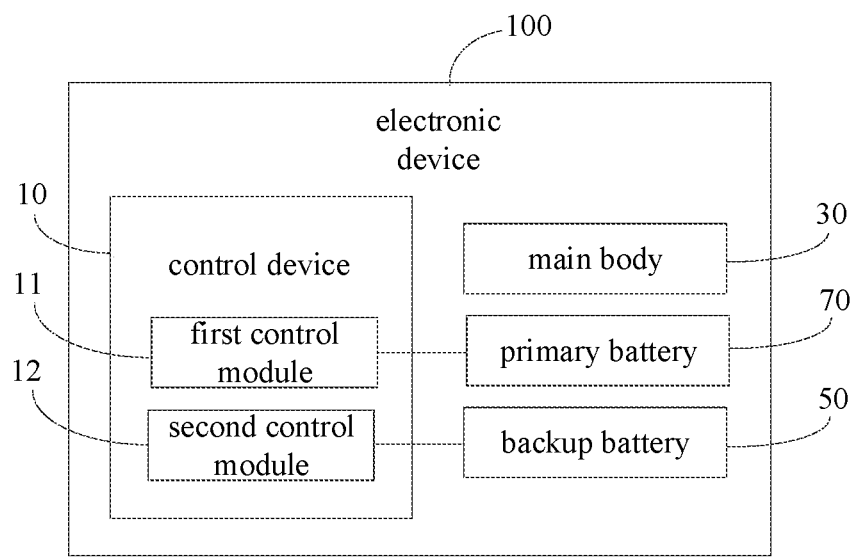
FIG. 2 illustrates the components of an electronic device according to certain embodiments of the present disclosure.

FIG. 2 shows the components of the electronic device according to certain embodiments of the present disclosure. As shown in FIG. 2, the electronic device 100 may include a main body 30, a backup battery 50, a primary battery 70, and a control device 10. The control device 10 may be connected to the backup battery 50 and the primary battery 70. The control device 10 may be used to control the electronic device 100. The backup battery 50 may be disposed on the main body 30. The primary battery 70 may be detachably coupled to the main body 30. The control device 10 includes a first control module 11 and a second control module 12. According to certain embodiments, the control method shown in FIG. 1 may be implemented by the control device 10. In certain embodiment, the control device 10 may include a memory storing a computer program, and a processor coupled to the memory to execute the computer program to implement the control method shown in FIG. 1.

For example, Step S11 may be implemented by the first control module 11, and Step S12 may be implemented by the second control module 12. That is, the first control module 11 may be used to control the primary battery 70 to supply power to the electronic device 100 when the electronic device 100 is activated and the primary battery 70 is successfully connected to the main body 30. The second control module 12 may be used to control the backup battery 50 to supply power to the electronic device 100 when the electronic device 100 is activated and the primary battery 70 fails to connect with the main body 30.

The control method, the control device 10 and the electronic device 100 according to certain embodiments of the present disclosure adopt a dual battery design, and the primary battery 70 may be replaced at any time, thereby solving the problem that the battery has insufficient capacity. The backup battery 50 may be used in the process of replacing the primary battery 70. Keeping the electronic device 100 powered when the primary battery is being replaced eliminates the need to turn off the electronic device 100, thus improving user experience.

The electronic device 100 according to certain embodiments of the present disclosure may include a mobile phone, a tablet computer, a remote controller of an unmanned aerial vehicle (UAV), an aerial surveillance device, or a UAV ground station. When performing aerial photography through a UAV, the remote controller may need to be equipped with a display device to monitor the video transmitted back from the UAV in real time to improve the quality of the aerial photography.

In certain embodiments, the control method and the control device 10 may be used for supplying power to a mobile phone, a tablet computer, a remote controller of a UAV, an aerial surveillance device or a UAV ground station, wherein dual battery switching is used. By using the control method and the control device 10, when the primary battery 70 has insufficient battery power and needs to be replaced, there is no need to turn off the electronic device. The backup battery 50 may be used to supply power to ensure the stability of the power supply during the plugging and unplugging of the primary battery 70.

Figure 3:
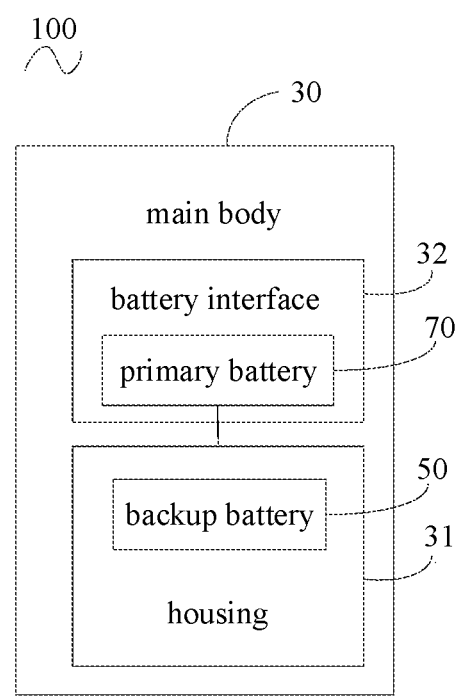
FIG. 3 illustrates an electronic device according to certain embodiments of the present disclosure.

FIG. 3 illustrates the electronic device according to certain embodiments of the present disclosure. As shown in FIG. 3, the main body 30 may include a housing 31 and a battery interface 32 disposed on the housing 31. The backup battery 50 and the control device 10 may be disposed within the housing 31. The primary battery 70 may be disposed outside the housing 31 and detachably coupled to the main body 30 through the battery interface 32.

Specifically, the backup battery 50 may be disposed inside the housing 31 and may be continuously present. The backup battery 50 may be invisible to the user. The primary battery 70 may be disposed outside the housing 31 and may be inserted into or removed from the battery interface 32 at any time. When the primary battery 70 is correctly inserted into the battery interface 32, it may indicate that the primary battery 70 is connected to the main body 30. However, further verification may be required to determine whether the primary battery 70 meets certain predetermined specifications so that the primary battery 70 is successfully connected to the main body 30. Details of the process is explained later.

Figure 4:
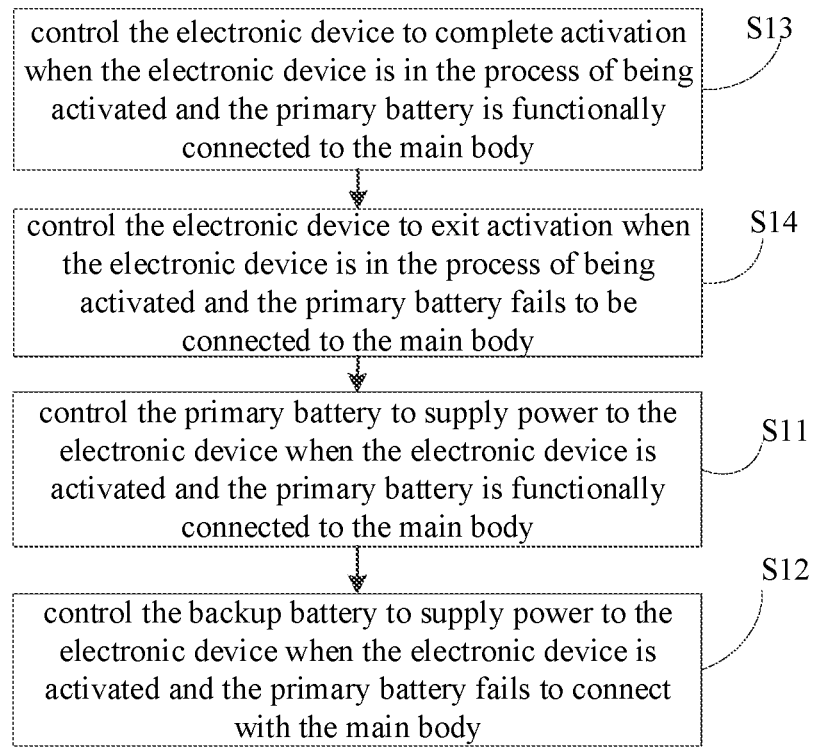
FIG. 4 illustrates a control method according to certain embodiments of the present disclosure.

Referring to FIG. 4, in certain embodiments, the control method may further include Step S13 and Step S14. Step S13 is to control the electronic device to complete activation when the electronic device is in the process of being activated and the primary battery is successfully connected to the main body; and Step S14 is to control the electronic device to exit activation when the electronic device is in the process of being activated and the primary battery fails to be connected to the main body.

Figure 5:
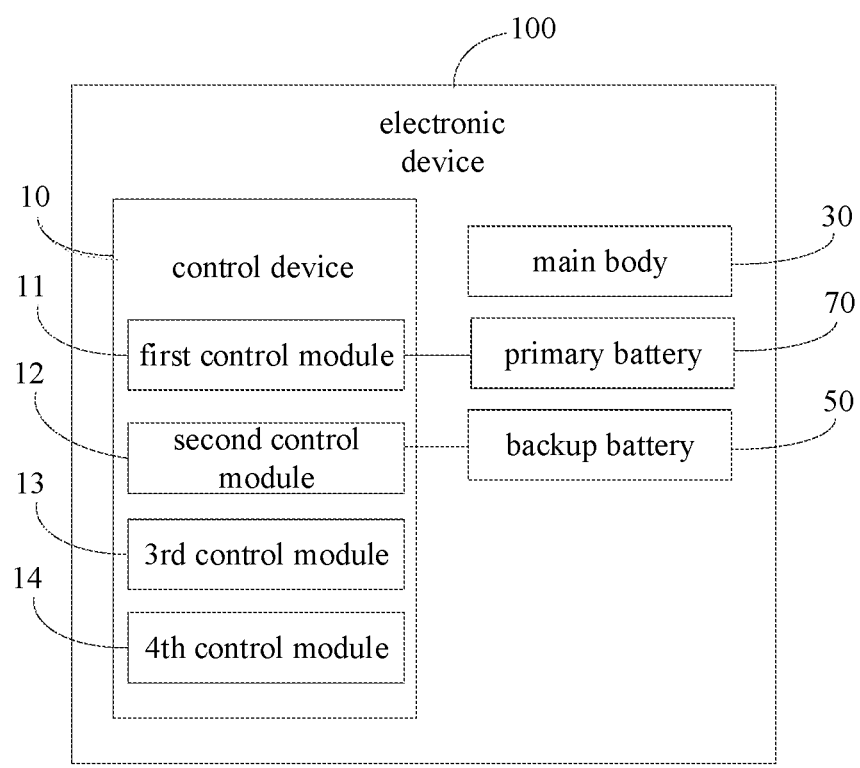
FIG. 5 illustrates the components of an electronic device according to certain embodiments of the present disclosure.

FIG. 5 shows the components of the electronic device according to certain embodiments of the present disclosure. Referring to FIG. 5, the control device 10 may include a third control module 13 and a fourth control module 14. For the control method shown in FIG. 4, Step S13 may be implemented by the third control module 13, and Step S14 may be implemented by the fourth control module 14. That is, the third control module 13 may be used to control the electronic device 100 to complete activation when the electronic device 100 is in the process of being activated and the primary battery 70 is successfully connected to the main body 30. The fourth control module 14 may be used to control the electronic device 100 to exit activation when the electronic device 100 is in the process of being activated and the primary battery 70 fails to connect with the main body 70. In certain embodiment, the control device 10 may include a memory storing a computer program, and a processor coupled to the memory to execute the computer program to implement the control method shown in FIG. 4.

For example, when the electronic device 100 is turned off, the user may press a start button to activate the electronic device 100. When the primary battery 70 is successfully connected to the main body 30, the third control module may control the electronic device 100 to complete the activation. When the connection of the primary battery 70 to the main body 30 fails, the fourth control module may control the electronic device 100 to turn off.

The control method and the control device 10 according to certain embodiments of the present disclosure may use the primary battery 70 to maintain power supply during normal operation of the electronic device 100. The backup battery 50 may maintain power supply when the electronic device 100 is in a standby mode, so that the primary battery 70 can be connected to the main body 100. When the connection between the primary battery 70 and main body 100 fails, the electronic device 100 may exit activation, that is, it is not turned on.

Figure 6:
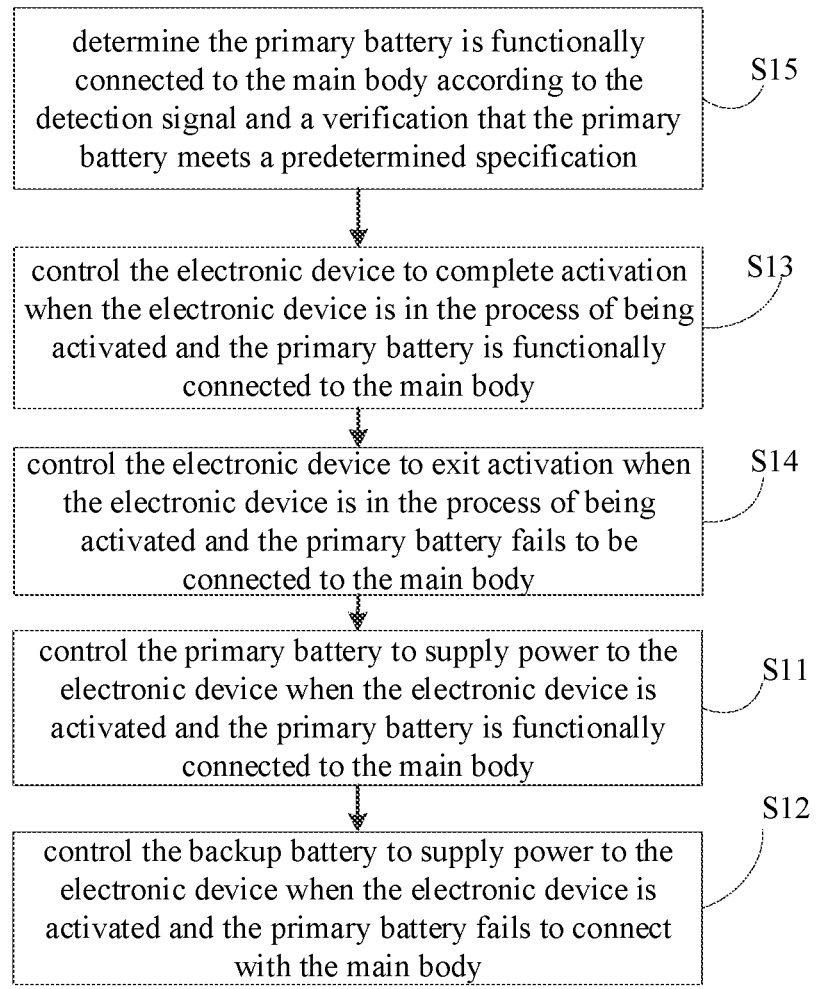
FIG. 6 illustrates a control method according to certain embodiments of the present disclosure.

FIG. 6 shows the control method according to certain embodiments of the present disclosure. For the method shown in FIG. 6, the electronic device may include a detection module. The detection module may be configured to detect whether the primary battery is connected to the main body and issue a corresponding detection signal. The control method may further include Step S15. Step S15 is to determine the primary battery is successfully connected to the main body according to the detection signal and a verification that the primary battery meets a predetermined specification.

Figure 7:
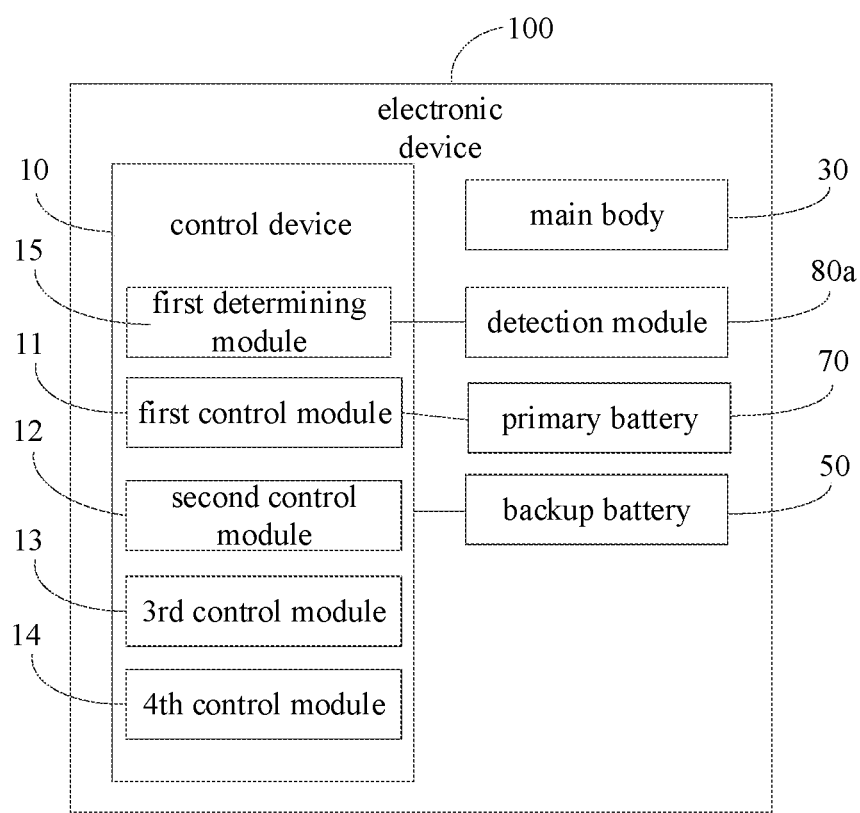
FIG. 7 illustrates the components of an electronic device according to certain embodiments of the present disclosure.

FIG. 7 shows the components of the electronic device according to certain embodiments of the present disclosure. Referring to FIG. 7, in certain embodiments, the electronic device 100 may include a detection module 80a. The detection module 80a may be configured to detect whether the primary battery 70 is connected to the main body 30 and issue a corresponding detection signal. The control device 10 may include a first determining module 15. Step S15 may be implemented by the first determining module 15. That is, the first determining module 15 may be configured to determine that the primary battery 70 is successfully connected to the main body 30 according to the detection signal and a verification that the verification primary battery 70 meets a predetermined specification.

Specifically, the detection module 80a may be a detection circuit to output a detection signal, and the detection module 80a is configured to detect a connection state of the primary battery 70 and the main body 30. The detection signal may be a high voltage signal or a low voltage signal, or another signal configured to indicate the connection state of the primary battery 70 and the main body 30. When the detection module 80a detects that the primary battery 70 is connected to the main body 30, a low voltage signal may be outputted. And when the detection module 80a detects that the primary battery 70 is not connected to the main body 30, a high voltage signal may be outputted. When the primary battery 70 is connected to the main body 30, further verification may be performed to determine whether the primary battery 70 meets a predetermined specification. The predetermined specification may include information such as remaining power, voltage, status, and the like of the primary battery 70. The verification process of the primary battery 70 is a matching process of the primary battery 70 and the electronic device 100. The first determining module 15 may determine that the primary battery 70 is successfully connected to the main body 30 only when the primary battery 70 is connected to the main body 30 and the primary battery 70 meets the predetermined specification.

Figure 8:
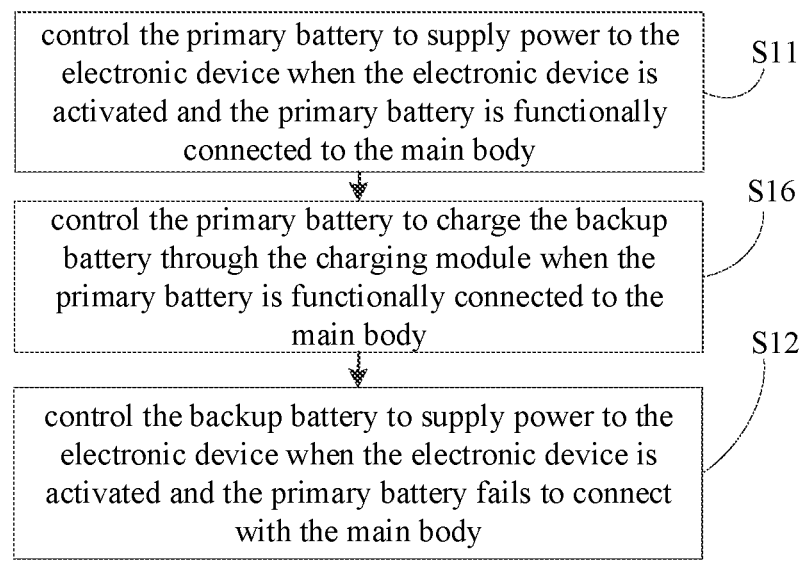
FIG. 8 illustrates a control method according to certain embodiments of the present disclosure.

FIG. 8 shows the control method according to certain embodiments of the present disclosure. For the method shown in FIG. 8, the electronic device may include a charging module. The control method may further include Step S16. Step S16 is to control the primary battery to charge the backup battery through the charging module when the primary battery is successfully connected to the main body.

Figure 9:
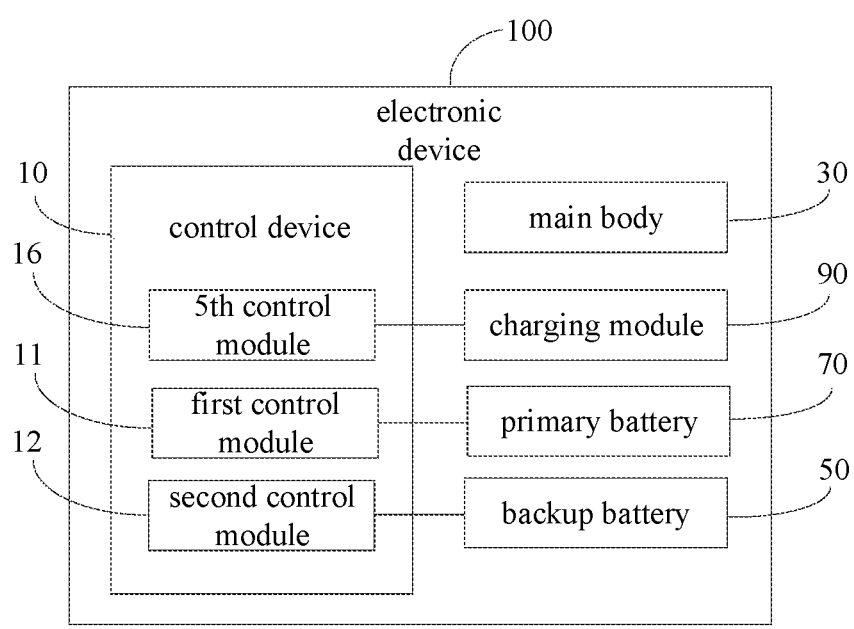
FIG. 9 illustrates the components of an electronic device according to certain embodiments of the present disclosure.

FIG. 9 illustrates the components of the electronic device according to certain embodiments of the present disclosure. Referring to FIG. 9, in certain embodiments, the electronic device 100 may include a charging module 90. The control device 10 may include a fifth control module 16. Step S16 may be implemented by the fifth control module 16. That is, the fifth control module 16 may be used to control the primary battery 70 to charge the backup battery 50 through the charging module 90 when the primary battery 70 is successfully connected to the main body 30.

With the foregoing configuration, the backup battery 50 may be recharged in time. Further, when a charging cable is connected to the electronic device 100, the backup battery 50 may also be charged through the charging cable.

In the process of charging the backup battery 50 by the primary battery 70, a power evaluation mechanism may be used. When the backup battery 50 is fully charged, the primary battery 70 may automatically turn off the charging.

Figure 10:
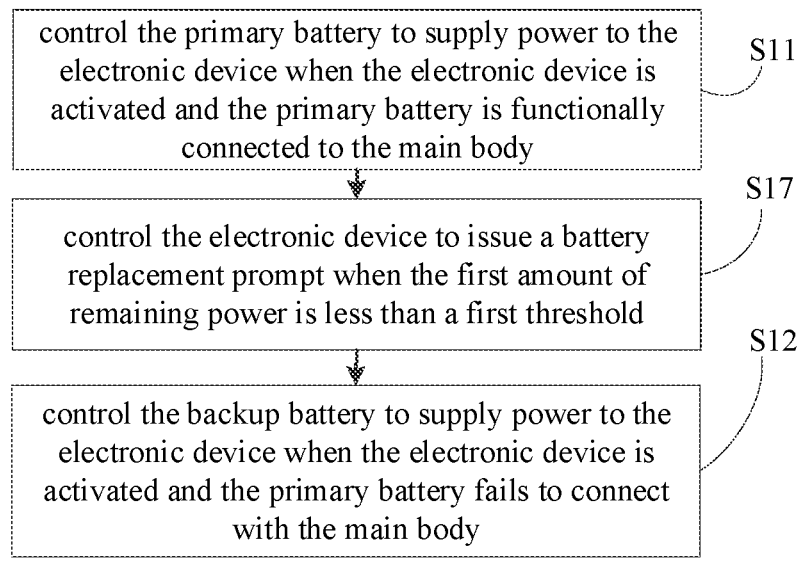
FIG. 10 illustrates a control method according to certain embodiments of the present disclosure.

FIG. 10 shows the control method according to certain embodiments of the present disclosure. For the control method shown in FIG. 10, the electronic device may include a first battery management module. The first battery management module is configured to detect a first amount of remaining power of the primary battery. The control method may further include Step S17. Step S17 is to control the electronic device to issue a battery replacement prompt when the first amount of remaining power is less than a first threshold.

Figure 11:
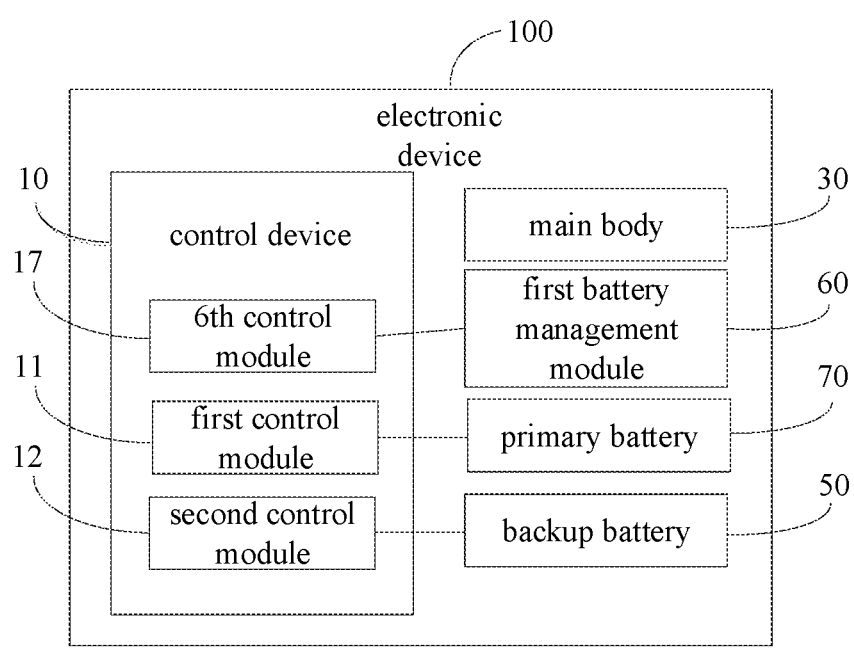
FIG. 11 illustrates the components of an electronic device according to certain embodiments of the present disclosure.

FIG. 11 shows the components of the electronic device according to certain embodiments of the present disclosure. Referring to FIG. 11, in certain embodiments, the electronic device 100 may include a first battery management module 60. The first battery management module 60 is configured to detect a first amount of remaining power of the primary battery 70. The control device 10 may include a 6th control module 17. Step S17 may be implemented by the 6th control module 17. That is, the 6th control module 17 may be configured to control the electronic device 100 to issue a battery replacement prompt when the first amount of remaining power is less than the first threshold.

For example, the first threshold may be 10%. When the amount of remaining power in the primary battery 70 is less than 10%, the 6th control module 17 may control the electronic device 100 to issue a battery replacement prompt. The battery replacement prompt may display, for example, "Power is low, please replace the battery!", or issue a beep sound, etc.

With the foregoing approach, on the one hand, negative impact on the battery life due to over-draining of the primary battery 70 may be prevented. On the other hand, the electronic device 100 may be prevented from suddenly entering the standby mode due to the depletion of the primary battery 70, thereby enhancing user experience.

Figure 12:
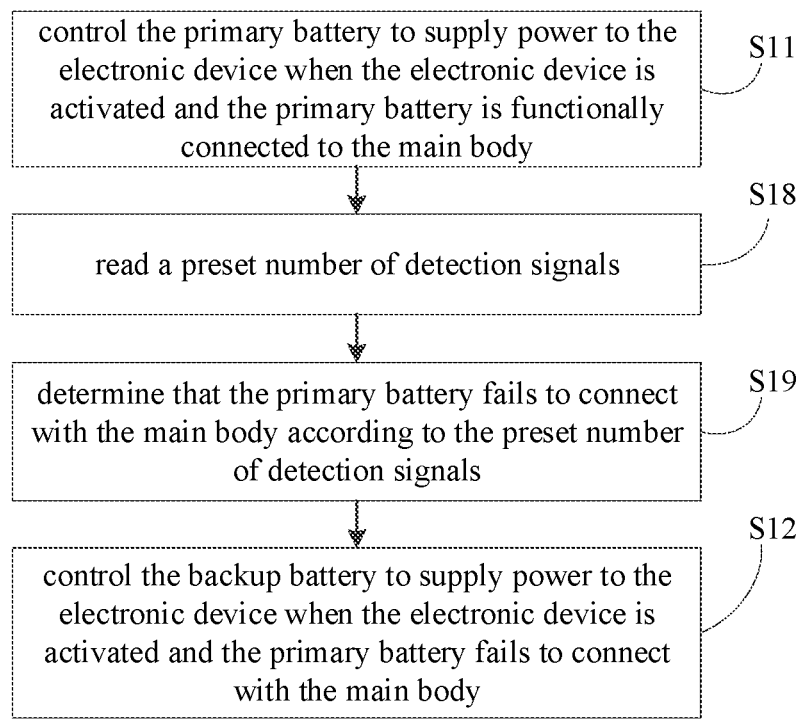
FIG. 12 illustrates a control method according to certain embodiments of the present disclosure.

FIG. 12 shows the control method according to certain embodiments of the present disclosure. For the control method shown in FIG. 12 the electronic device may include a detection module. The detection module is configured to detect whether the primary battery is connected to the main body and issue a corresponding detection signal. The control method may further include the Step S18 and Step S19. Step S18 is to read a preset number of detection signals; and Step S19 is to determine that the primary battery fails to connect with the main body according to the preset number of detection signals.

Figure 13:
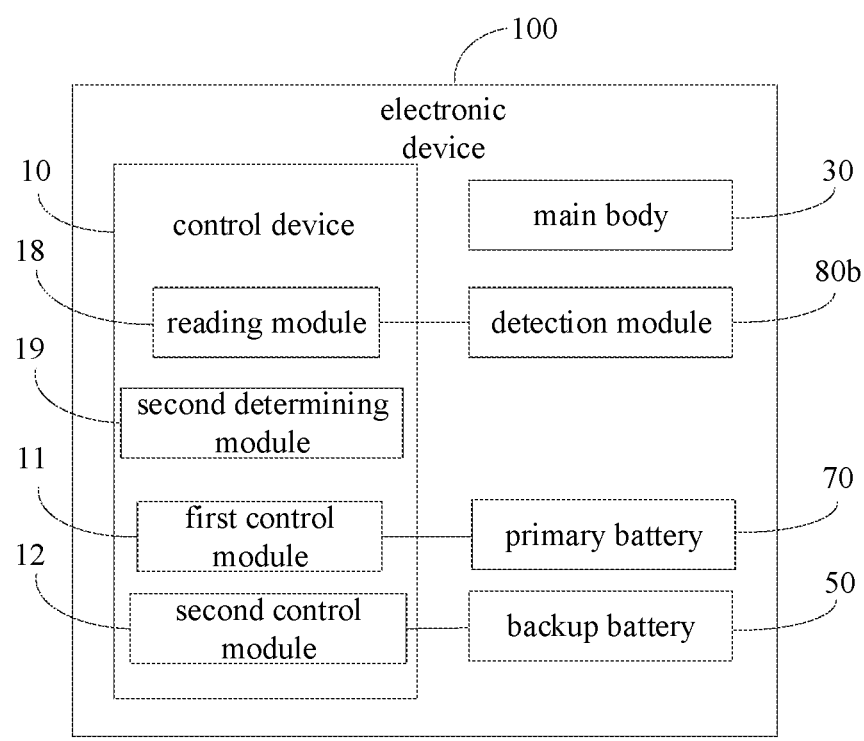
FIG. 13 illustrates the components of an electronic device according to certain embodiments of the present disclosure.

FIG. 13 shows the components of the electronic device according to certain embodiments of the present disclosure. Referring to FIG. 13, in certain embodiments, the electronic device 100 may include a detection module 80b. The detection module 80b is configured to detect whether the primary battery 70 is connected to the main body 30 and output a corresponding detection signal. The control device 10 may include a reading module 18 and a second determining module 19. Step S18 of the control method shown in FIG. 12 may be implemented by the reading module 18. Step S19 may be implemented by the second determining module 19. That is, the reading module 18 may be used to read a preset number of detection signals. The second determining module 19 may be configured to determine that the primary battery 70 fails to connect with the main body 30 according to the preset number of detection signals.

In certain embodiments, the detection module 80*b* may be a detection circuit used for detecting the connection state of the primary battery 70 and the main body 30. The detection signal may be a high voltage signal or a low voltage signal. The details will not be repeated here.

The preset number may be 3, so that false alarms may be prevented. For example, when the detection signals read by the reading module 18 are high voltage signals for three consecutive times, it indicates that the primary battery 70 is disconnected from the main body 30. According to these signals, the second determining module 19 may determine that the primary battery 70 fails to connect with the main body 30.

Figure 14:
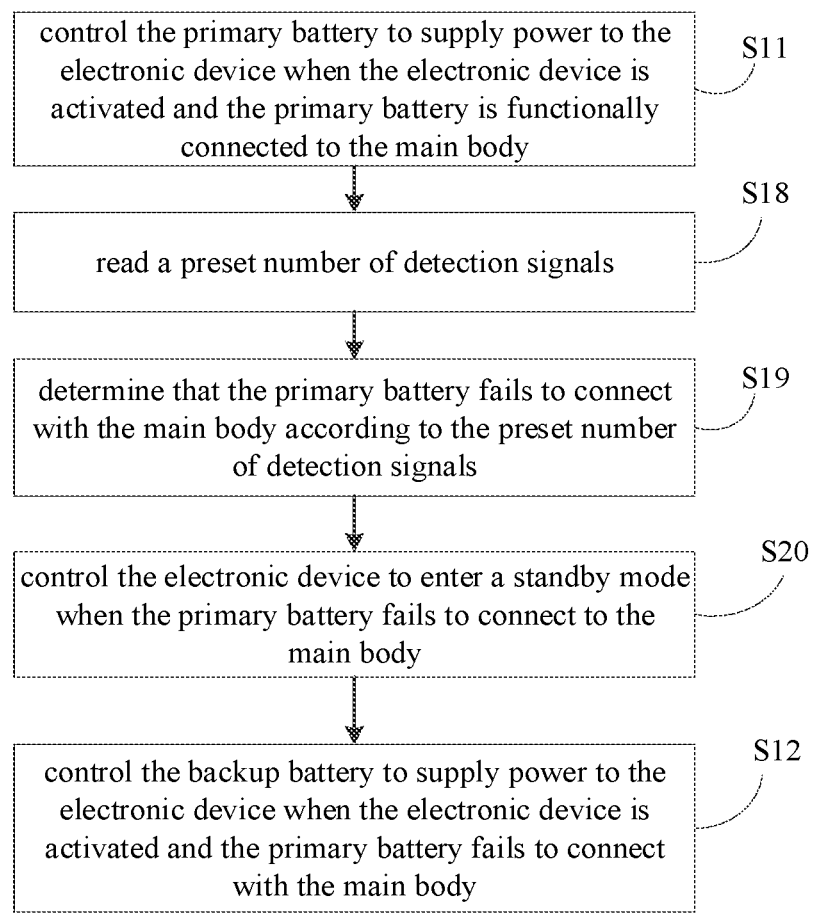
FIG. 14 illustrates a control method according to certain embodiments of the present disclosure.

FIG. 14 shows the control method according to certain embodiments of the present disclosure. Referring to FIG. 14, in certain embodiments, the control method may further include Step S20. Step S20 is to control the electronic device to enter a standby mode when the primary battery fails to connect to the main body.

Figure 15:
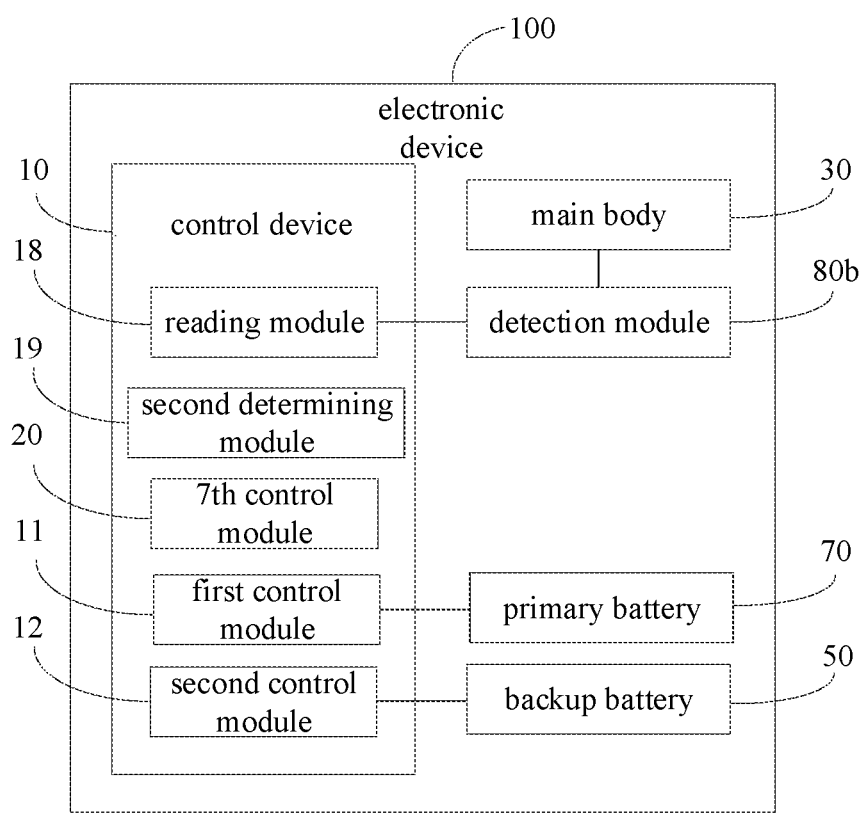
FIG. 15 illustrates the components of an electronic device according to certain embodiments of the present disclosure.

FIG. 15 shows the components of the electronic device according to certain embodiments of the present disclosure. Referring to FIG. 15, in certain embodiments, the control device 10 may include a 7th control module 20. Step S20 may be implemented by the 7th control module 20. That is, the 7th control module 20 may be used to control the electronic device 100 to enter a standby mode when the second determining module 19 determines that the primary battery 70 fails to connect with the main body 30.

In certain embodiments, if the user attempts to wake up the electronic device 100 when the electronic device 100 enters the standby mode, and the detection module 80*b* detects that the primary battery 70 is not connected to the main body 30, the electronic device 100 may not be activated. Only when the primary battery 70 is connected to the main body 30, the electronic device 100 may enter the process of activation, that is, enter subsequent process of performing verification and the like, and the details are not repeated here.

In certain embodiments, the capacity of the backup battery 50 is less than the capacity of the primary battery 70. It may be understood that the primary battery 70 may be used to maintain power supply when the electronic device 100 operates normally. The backup battery 50 may be used to maintain power supply to the electronic device 100 in the standby mode, so that after the primary battery 70 is replaced, the electronic device 100 may quickly return from the standby mode to the normal operation mode. Thus, the capacity of the backup battery 50 may smaller than the capacity of the primary battery 70.

In certain embodiments, the backup battery 50 may have a capacity of less than 2500 mAh, where the standby power consumption may be about 50 mA. In certain embodiments, the capacity of the backup battery 50 may be 1000 mAh and the standby power consumption may be about 20 mA.

Figure 16:
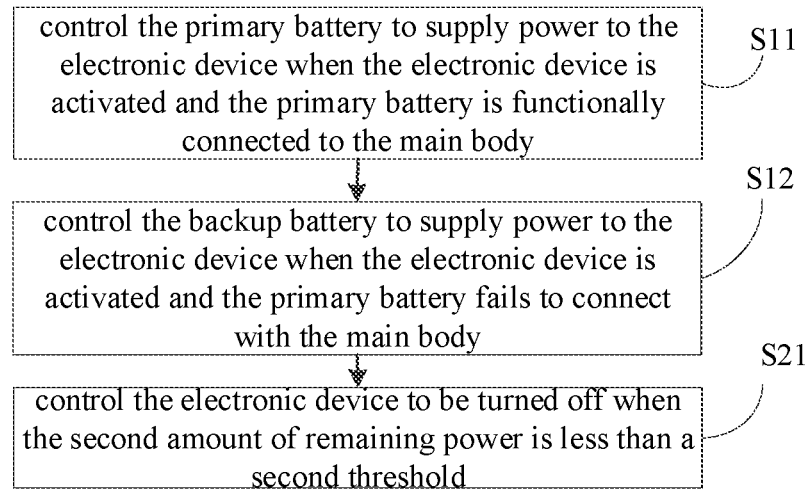
FIG. 16 illustrates a control method according to certain embodiments of the present disclosure.

FIG. 16 shows the control method according to certain embodiments of the present disclosure. For the control method shown in FIG. 16, the electronic device may include a second battery management module. The second battery management module may be configured to detect a second amount of remaining power of the backup battery. The control method may further include Step S21. Step S21 is to control the electronic device to be turned off when the second amount of remaining power is less than a second threshold.

Figure 17:
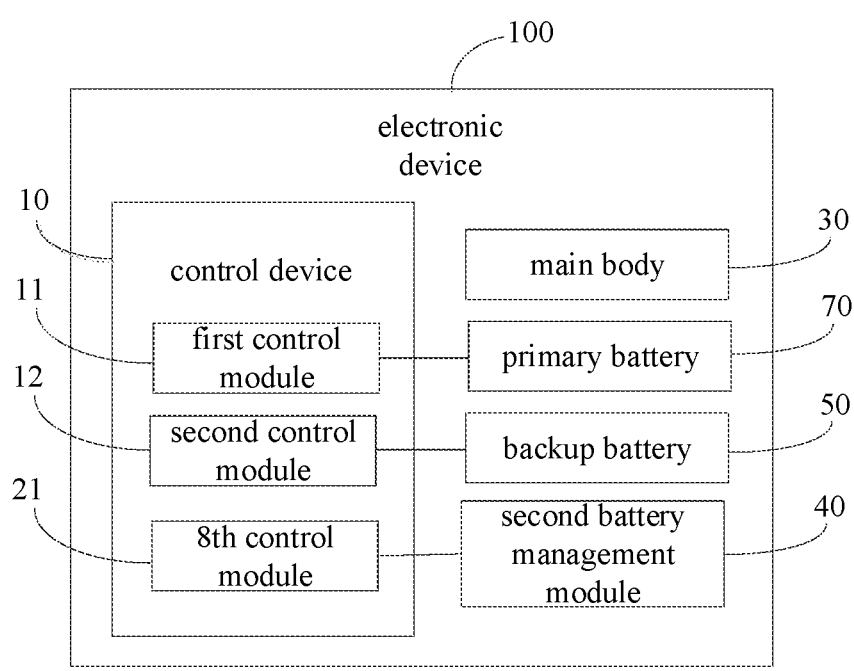
FIG. 17 illustrates the components of an electronic device according to certain embodiments of the present disclosure.

Referring to FIG. 17, in certain embodiments, the electronic device 100 may include a second battery management module 40. The second battery management module 40 may be configured to detect a second amount of remaining power of the backup battery 50. The control device 10 may include an 8th control module 21. Step S21 may be implemented by the 8th control module 21. That is, the 8th control module 21 may be configured to control the electronic device to be turned off when the second amount of remaining power is less than the second threshold. For example, the second threshold may be 5%. Thus, negative impact on the battery life due to over-draining of the backup battery 50 may be prevented.

Figure 18:
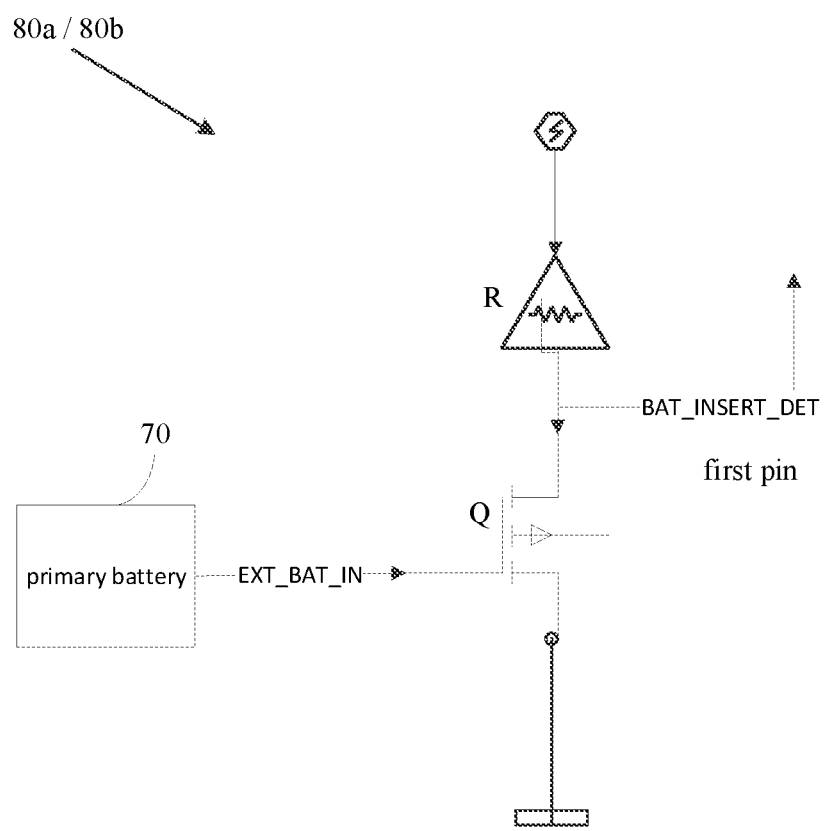
FIG. 18 illustrates a circuit diagram of a detection module according to certain embodiments of the present disclosure.

FIG. 18 illustrates a circuit diagram of a detection module according to certain embodiments of the present disclosure. Referring to FIG. 18, in certain embodiments, the detection module 80*a* or the detection module 80*b* may include a transistor and a resistor. The gate of the transistor may be connected to the primary battery 70. The source of the transistor may be grounded. The drain of the transistor may be connected to one end of the resistor and a first pin. The other end of the resistor may be connected to the power supply voltage. The first pin is used for the determining the connection state of the primary battery 70 and the main body 30.

Specifically, when the primary battery 70 is connected to the main body 30, the first pin may output a low voltage. When the primary battery 70 is disconnected from the main body 30, the first pin may output a high voltage. Thus, the connection state of the primary battery 70 and the main body 30 may be detected according to the voltage level of the first pin.

Figure 19:
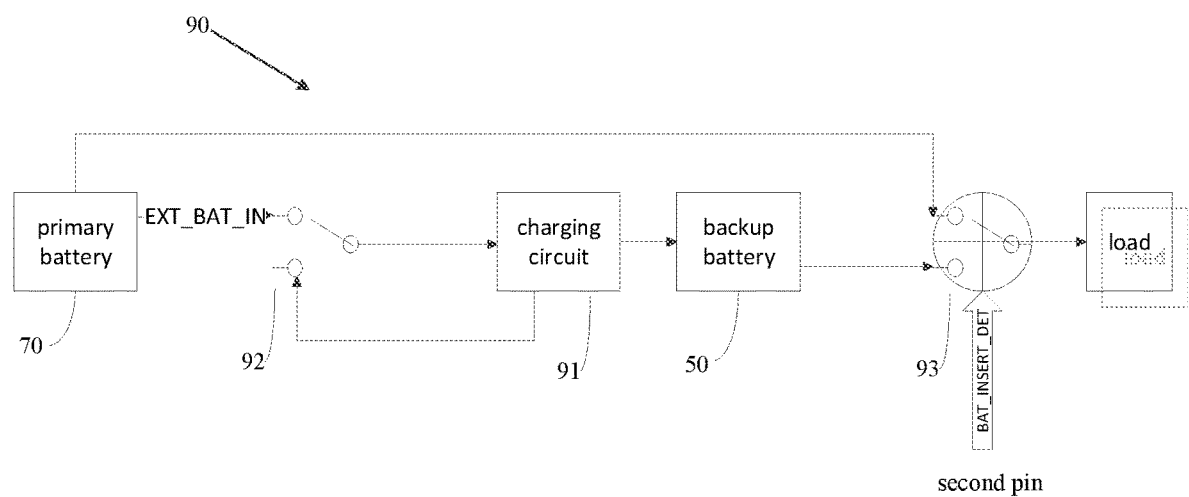
FIG. 19 illustrates a circuit diagram of a charging module according to certain embodiments of the present disclosure.

FIG. 19 illustrates a circuit diagram of a charging module according to certain embodiments of the present disclosure. Referring to FIG. 19, in certain embodiments, the charging module 90 may include a charging circuit 91, a first two-way switch 92, and a second two-way switch 93. The first input end of the first two-way switch 92 is connected to the primary battery 70. The second input end of the first two-way switch 92 is connected to the output end of the charging circuit 91. The output end of the first two-way switch 92 is connected to the input end of the charging circuit 91. The charging circuit 91 is connected to the backup battery 50. The first input end of the second two-way switch 93 is connected to the primary battery 70. The second input end of the second two-way switch 93 is connected to the backup battery 50. The output end of the second two-way switch 93 is connected to a load. The second two-way switch may include a second pin. The second pin may be used to receive a signal indicating the connection state of the primary battery 70 and the main body 30.

Specifically, when the primary battery 70 is connected to the main body 30, if the backup battery 50 is not fully charged, the first input end of the first two-way switch 92 is connected to the output end, and the backup battery 50 is powered by the charging circuit 91. When the battery of the backup battery 50 is fully charged, the second input end of the first two-way switch 92 is connected to the output end, and the charging of the backup battering is turned off. When the second pin receives the signal that the primary battery 70 is connected to the main body 30, the first input end of the second two-way switch 93 is connected to the output end, and the primary battery 70 supplies power to the load. When the second pin receives the signal that the primary battery 70 is disconnected from the main body 30, the second input end of the second two-way switch 93 is connected to the output end, and the backup battery 70 supplies power to the load.

The terms "first" and "second" are used for descriptive purposes only and are not to be construed as indicating or implying a relative importance or implicitly indicating the number of technical features indicated. Thus, features defined by "first" or "second" may include one or more of the described features either explicitly or implicitly. In the description of the embodiments of the present disclosure, the meaning of "a plurality" is two or more unless specifically defined otherwise.

In the description of the embodiments of the present disclosure, it should be noted that the terms "installed", "connecting", and "connected" are to be understood broadly, and may indicate fixed connections, detachable connections or integral connections. The components may be mechanically connected, electrically connected or may communicate with each other. The components may be connected directly or indirectly through an intermediate medium. Two components may be connected internally or two components may interact with each other. For those skilled in the art, the specific meanings of the above terms in the embodiments of the present disclosure may be understood on a case-by-case basis.

The above disclosure provides many different embodiments or examples for implementing different structures. In order to simplify the disclosure of embodiments of the present disclosure, only certain components and arrangements of the specific examples are described. They are merely examples and are not intended to limit the disclosure. Further, the present disclosure may repeatedly use reference numerals and/or reference letters in different examples, which are for the purpose of simplicity and clarity, and do not in themselves indicate the relationship between the various embodiments and/or arrangements discussed. Moreover, embodiments of the present disclosure provide examples of various specific processes and materials, but other processes and/or other materials may be used.

In the description, the terms "an embodiment," "certain embodiments" "exemplary embodiments" "an example", "a specific example", or "some examples" may refer to the particular features, structures, materials or features described in at least one embodiment or example of the disclosure. The above terms are not necessarily referring to the same embodiment or exemplary manner. Furthermore, the particular features, structures, materials, or characteristics described may be combined in a suitable manner in any one or more embodiments or examples.

Any process or method illustrated in the flowcharts or otherwise described may represent a module, segment or portion of code that may include one or more executable instructions for implementing the steps of a particular logical function or process. The scope of certain embodiments of the disclosure may include additional implementations, in which the functions may be performed in a substantially simultaneous manner or in an opposite time order depending on the functions involved, in the order shown or discussed.

The logic and/or steps illustrated in the flowcharts or otherwise described may be considered as an ordered list of executable instructions for implementing logical functions, and may be embodied in a computer readable medium. The computer medium may be used in conjunction with an instruction execution system, apparatus, or device (e.g., a computer-based system, a system including a processing module, or other systems that can fetch instructions and execute instructions from an instruction execution system, apparatus, or device). A "computer-readable medium" may be any apparatus that can contain, store, communicate, propagate, or transport a program for use in an instruction execution system, apparatus, or device, or in conjunction with the instruction execution system, apparatus, or device. Specific examples of computer readable media may include: electrical connections having one or more wires (electronic devices), portable computer disk cartridges (magnetic devices), random-access memory (RAM), read-only memory (ROM), erasable editable read-only memory (EPROM or flash memory), fiber optic devices, and portable compact disk read-only memory (CDROM).

Portions of the embodiments of the present disclosure may be implemented with hardware, software, firmware or a combination thereof. In the above-described embodiments, a plurality of steps or methods may be stored in a memory and implemented by software or firmware of a suitable instruction execution system. For example, if implemented with hardware, they may be implemented by any one or combination of: discrete logic circuits of logic gates for implementing logic functions on data signals, application specific integrated circuits with suitable combinational logic gates, programmable gate arrays (PGAs), field programmable gate arrays (FPGAs), etc.

All or part of the steps included in the method of implementing the foregoing embodiments may be completed by a program to instruct related hardware, and the program may be stored in a computer readable storage medium. When executed, one or a combination of the steps of the method embodiments may be included.

Further, each functional unit in each embodiment of the present disclosure may be integrated into one processing module, or each unit may exist separately, or two or more units may be integrated into one module. The above integrated modules may be implemented in the form of hardware or in the form of software functional modules. The integrated modules, if implemented in the form of software functional modules and sold or used as stand-alone products, may also be stored in a computer readable storage medium. The storage medium may be a read only memory, a magnetic disk or an optical disk or the like.

Although the embodiments of the present disclosure have been shown and described, they are illustrative and are not to be construed as limiting the scope of the disclosure. The embodiments may be subject to variations, modifications, and substitutions.

What is claimed is:

1. A control method for controlling an electronic device having a main body, comprising:
   in response to the electronic device being activated and a primary battery being functionally connected to the main body of the electronic device, controlling the primary battery to power the electronic device;
   in response to the electronic device being activated and the primary battery being functionally disconnected from the main body of the electronic device, controlling a backup battery to power the electronic device;
   during an activation process of the electronic device, in response to the primary battery being functionally connected to the main body of the electronic device, controlling the electronic device to complete the activation process; and
   during the activation process of the electronic device, in response to the primary battery being functionally disconnected from the main body of the electronic device, controlling the electronic device to exit the activation process.

2. The control method according to claim 1, further comprising:
   determining that the primary battery is functionally connected to the main body of the electronic device in response to the primary battery being electrically connected to the main body of the electronic device and the primary battery meeting a set of specifications.

3. The control method according to claim 2, further comprising:
   controlling the primary battery to charge the backup battery in response to the primary battery being functionally connected to the main body of the electronic device.

4. The control method according to claim 2, further comprising:
   detecting a first amount of remaining power in the primary battery; and
   issuing a battery replacement prompt in response to the first amount of remaining power being below a first threshold.

5. The control method according to claim 2, further comprising:
   reading a connection detection signal for a first number of times, the connection detection signal having one of: a first value indicating a connection state, and a second value indicating a disconnection state; and
   determining that the primary battery is electrically disconnected from the main body of the electronic device in response to detecting the second value for the first number of times consecutively in the connection detection signal.

6. The control method according to claim 5, further comprising:
   controlling the electronic device to enter a standby mode in response to the primary battery being functionally disconnected from the main body of the electronic device.

7. The control method according to claim 1, further comprising:
   detecting a second amount of remaining power in the backup battery; and
   controlling the electronic device to be turned off in response to the second amount of remaining power being below a second threshold.

8. A control device for controlling an electronic device, comprising:
   a non-transitory memory storing a computer program, and
   a processor coupled to the memory to execute the computer program to cause the processor to perform:
      in response to the electronic device being activated and a primary battery being functionally connected to a main body of the electronic device, controlling the primary battery to power the electronic device;
      in response to the electronic device being activated and the primary battery being functionally disconnected from the main body of the electronic device, controlling a backup battery to power the electronic device;
      during an activation process of the electronic device, in response to the primary battery being functionally connected to the main body of the electronic device, controlling the electronic device to complete the activation process; and
      during the activation process of the electronic device, in response to the primary battery being functionally disconnected from the main body of the electronic device, controlling the electronic device to exit the activation process.

9. An electronic device, comprising:
   a main body;
   a primary battery;
   a backup battery; and
   a control device configured to perform:
      in response to the electronic device being activated and a primary battery being functionally connected to the main body of the electronic device, controlling the primary battery to power the electronic device;
      in response to the electronic device being activated and the primary battery being functionally disconnected from the main body of the electronic device, controlling a backup battery to power the electronic device;
      during an activation process of the electronic device, in response to the primary battery being functionally connected to the main body of the electronic device, controlling the electronic device to complete the activation process; and
      during the activation process of the electronic device, in response to the primary battery being functionally disconnected from the main body of the electronic device, controlling the electronic device to exit the activation process.

10. The electronic apparatus as claimed in claim 9, wherein:
    the main body comprises a housing and a battery interface disposed on the housing;
    the backup battery is disposed inside the housing; and
    the primary battery is disposed outside the housing and detachably connected to the main body through the battery interface.

11. The electronic device of claim 10, wherein:
    the primary battery has a first battery capacity;
    the backup battery has a second battery capacity; and
    the second battery capacity is less than the first battery capacity.

12. The electronic device of claim 11, wherein the second battery capacity is less than 2500 mAh.

13. The electronic device according to claim 9, wherein:
    the electronic device further comprises a detection circuit that outputs a connection detection signal having one of: a first voltage level in response to the primary battery being electrically connected to the main body, or a second voltage level in response to the primary battery being electrically disconnected from the main body; and
    the control device is further configured to determine that the primary battery is functionally connected to the main body of the electronic device in response to detecting the first voltage level in the connection detection signal and the primary battery meeting a set of specifications.

14. The electronic device according to claim 13, wherein the control device is further configured to:
    read the connection detection signal for a first number of times; and
    determine that the primary battery is functionally disconnected from the main body of the electronic device in response to detecting the second voltage level in the connection detection signal for the first number of times consecutively.

15. The electronic device according to claim 13, wherein:
the detection circuit includes a transistor and a resistor, wherein a gate of the transistor is connected to the primary battery, a source of the transistor is grounded, a drain of the transistor is connected to a first end of the resistor and a first pin, and a second end of the resistor is connected to a power supply.

16. The electronic device of claim 9, wherein:
the electronic device further includes a charging circuit; and
the control device is further configured to control the primary battery to charge the backup battery through the charging circuit in response to the primary battery being functionally connected to the main body.

* * * * *